United States Patent
Lai et al.

(10) Patent No.: US 9,258,343 B2
(45) Date of Patent: Feb. 9, 2016

(54) STREAMING DATA DOWNLOADING METHOD AND COMPUTER READABLE RECORDING MEDIUM THEREOF

(71) Applicant: WISTRON CORP., New Taipei (TW)

(72) Inventors: Pei-Ling Lai, New Taipei (TW); Po-Hsu Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 388 days.

(21) Appl. No.: 13/725,335

(22) Filed: Dec. 21, 2012

(65) Prior Publication Data

US 2014/0108502 A1  Apr. 17, 2014

(30) Foreign Application Priority Data

Oct. 11, 2012  (TW) .............................. 101137423 A

(51) Int. Cl.
| | |
|---|---|
| H04L 29/06 | (2006.01) |
| H04L 29/08 | (2006.01) |
| H04N 21/2385 | (2011.01) |
| H04N 21/24 | (2011.01) |
| H04N 21/61 | (2011.01) |
| H04N 21/845 | (2011.01) |

(52) U.S. Cl.
CPC ............ *H04L 65/60* (2013.01); *H04L 65/4084* (2013.01); *H04L 65/4092* (2013.01); *H04L 67/06* (2013.01); *H04L 67/108* (2013.01); *H04L 67/325* (2013.01); *H04N 21/2385* (2013.01); *H04N 21/2401* (2013.01); *H04N 21/6125* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 7,337,231 | B1 * | 2/2008 | Li ................................. | 709/231 |
| 7,543,073 | B2 * | 6/2009 | Chou ...................... | H04L 47/10 |
| | | | | 709/231 |
| 8,892,761 | B1 * | 11/2014 | Dingle et al. ................. | 709/231 |
| 2004/0078392 | A1 | 4/2004 | Morita | |
| 2007/0162611 | A1 * | 7/2007 | Yu et al. ....................... | 709/232 |
| 2009/0136198 | A1 | 5/2009 | Chen et al. | |

(Continued)

FOREIGN PATENT DOCUMENTS

| | | |
|---|---|---|
| CA | 2759880 A1 | 9/2010 |
| JP | 2004-48704 A | 2/2004 |

(Continued)

OTHER PUBLICATIONS

Liu, Yong. "On the minimum delay peer-to-peer video streaming: how realtime can it be?." Proceedings of the 15th international conference on Multimedia. ACM, 2007.*

(Continued)

*Primary Examiner* — Scott B Christensen
*Assistant Examiner* — Lam Do
(74) *Attorney, Agent, or Firm* — Li & Cai Intellectual Property (USA) Office

(57) ABSTRACT

A streaming data downloading method is illustrated, which is adaptive to a video player downloading a video file from a video server via Internet. The method includes dividing the video file into a plurality of time sections by the video player, sending several downloading requests to the video server for simultaneously downloading data corresponding to different time sections based on the number of the downloading requests. Therefore, data of the video file may be downloaded efficiently and waiting time for users may be drastically reduced.

19 Claims, 6 Drawing Sheets

(56) References Cited

U.S. PATENT DOCUMENTS

| | | | |
|---|---|---|---|
| 2011/0096828 A1* | 4/2011 | Chen et al. | 375/240.02 |
| 2011/0225302 A1 | 9/2011 | Park et al. | |
| 2012/0179834 A1* | 7/2012 | van der Schaar et al. | 709/231 |
| 2013/0227102 A1* | 8/2013 | Beck et al. | 709/223 |

FOREIGN PATENT DOCUMENTS

| | | | |
|---|---|---|---|
| JP | 2006-526215 A | 11/2006 | |
| JP | 2012-80417 A | 4/2012 | |
| KR | 10-2007-0020727 A | 2/2007 | |
| KR | 10-2010-0113758 A | 10/2010 | |
| WO | WO2005/091161 A1 | 9/2005 | |
| WO | WO2011/038034 A1 | 3/2011 | |

OTHER PUBLICATIONS

Beringer, Jürgen, and Eyke Hüllermeier. "Online clustering of parallel data streams." Data & Knowledge Engineering 58.2 (2006): 180-204.*

Wu, Kun-Lung, Philip S. Yu, and Joel L. Wolf. "Segment-based proxy caching of multimedia streams." Proceedings of the 10th international conference on World Wide Web. ACM, 2001.*

Japan Patent Office, Office Action issued on Nov. 26, 2013.

Korean Patent Office, Office Action issued on Dec. 2, 2013.

European Patent Office, Eruopean Search Report, Feb. 4, 2014.

Sang-Seok Jung, et al., Poly Harmonic Staggered Broadcasting Method for Efficient Video on Demand Service, IEEE Computer Society, 11th IEEE Symposium on Object Oriented Real-Time Distributed Computing, 2008 IEEE DOI 10.1109/ISORC 2008.81, pp. 543-550.

Mingzhe Li,Using Bandwidth Estimation to Optimize Buffer and Rate Selection for Streaming Multimedia over IEEE 802.11 Wireless Networks,Dec. 2006,PHD dissertation, GT.

Korea Patent Office, Office action issued on Jul. 7, 2014.

Taiwan Patent Office, Office action issued on May 20, 2015.

Japan Patent Office, Office action issued on Jul. 28, 2015.

* cited by examiner

STREAMING DATA DOWNLOADING METHOD AND COMPUTER READABLE RECORDING MEDIUM THEREOF

BACKGROUND OF THE INVENTION

1. Field of the Invention

The present invention relates to a data downloading method; in particular, to a streaming data downloading method.

2. Description of Related Art

With the widespread of the Broadband network, it's more popular to transmit the video data through the network platform. Users can watch the video file stored on the Internet at any time, and watch it at the local site by downloading the video data through the local computer or Web TV.

Nevertheless, the most serious problem for the users is that they must wait for the local device preloading a portion of the video data to play the video. The length of preloading time depends on the data amount of the file, bandwidth, and the network traffic at that time. It costs users more time to wait for the local device preloading sufficient data, when the bandwidth is not sufficient or the network traffic is large.

On the other hand, if users want to 「fast forward」 the video to watch the posterior part when they watch the video, the local device must send a request to the source of the video file to download the user-designated section because the device may not have preloaded the user-designated section. The above process will cause the users to wait for the device preloading data before watching the video. Users cannot watch the video smoothly and thus usually have a bad experience due to the above condition.

SUMMARY OF THE INVENTION

The embodiment of the present invention provides a streaming data downloading method which can be used for the video player to download the video file from the video server via the Internet, including sending the request to the video server to download the video file and downloading the buffering data from the beginning of the buffering section; calculating the downloading time for downloading the whole buffering data, dividing the downloading time to a plurality of time sections to separately download the buffering data of each time sections from the video server; selecting at least one section as the downloading section and sending a request to the video server to download the data of the chosen section to form multiple downloading channels according to the number of the channels; simultaneously downloading the data from multiple downloading sections according to multiple downloading channels; checking if there is any downloading has been accomplished of the above mentioned downloading section; when one downloading has been finished, checking if there is still any time section which has not been requested to download; if there is still time section which has not been requested to download, selecting one of the time sections which has not been requested to download as the new downloading section to maintain the number of the channels; sending a new downloading request to the video server to download the data of the new downloading section until the data of the mentioned multiple sections has been downloaded.

Furthermore, the embodiment of the present invention provides a streaming data downloading method which can be used for the video player to download the video file from the video server via the Internet, including sending a request to the video server to download the video file; downloading the buffering data from the beginning of the buffering data and calculating the downloading time for downloading the buffering data and the file time for downloading the video file; dividing the downloading time to a plurality of time sections according to the downloading time in order to separately download the buffering data of each time sections from the video server; selecting at least one section of the multiple time sections as the downloading section and sending a request to the video server to download the data of the chosen section to form multiple downloading channels according to the number of the channels; simultaneously downloading the data from multiple downloading sections according to multiple downloading channels; when one downloading has been accomplished, checking if there is still time section after the multiple downloading sections which has not been requested to download; if there is still time section which has not been requested to download, selecting one of the time sections which has not been requested to download as the new downloading section; sending a new downloading request to the video server to download the data of the new section until the data of the mentioned multiple sections has been downloaded.

On top of that, the embodiment of the present invention provides a non-transitory computer readable recording medium which can put the above methods into practice.

In order to further the understanding regarding the present invention, the following embodiments are provided along with illustrations to facilitate the disclosure of the present invention.

BRIEF DESCRIPTIONS OF THE DRAWINGS

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

[The Embodiment of the Streaming Data Downloading Method]

Figure 1:
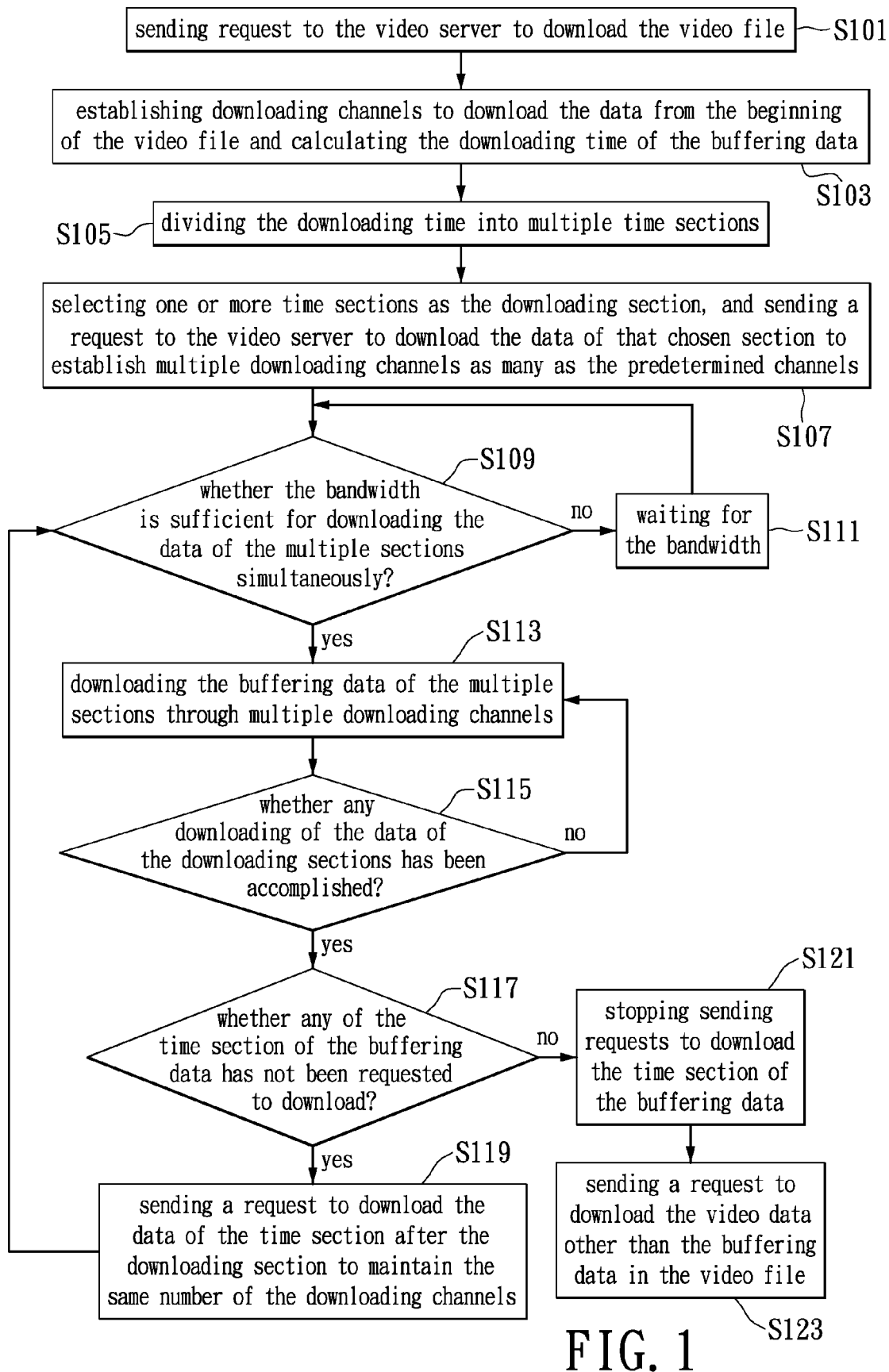
FIG. 1 is the flow diagram of the streaming data downloading method of the embodiment of this invention.

Please refer to FIG. 1, FIG. 1 is the flow diagram of the embodiment of the present invention which provides a streaming data downloading method. The embodiment of the present invention can be used for the video device to download video file from the server through the Internet.

Figure 2:
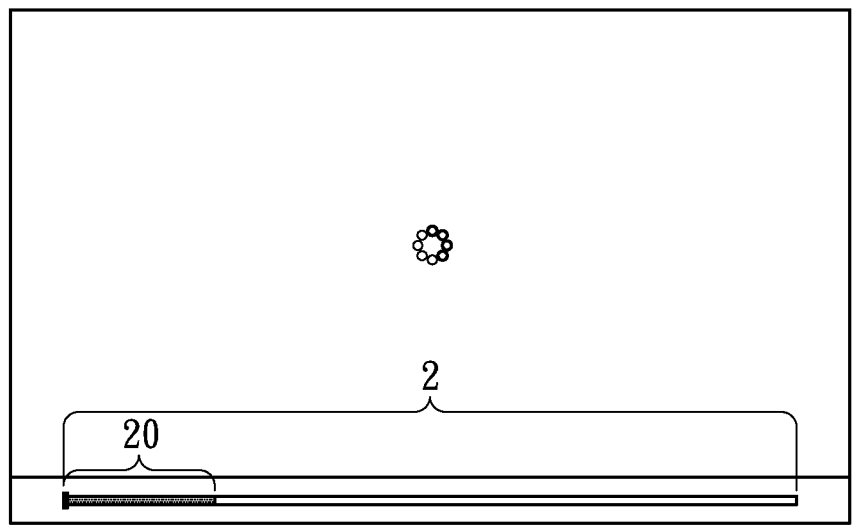
FIG. 2 is the time axis of the video file (which has not been displayed) of the embodiment of this invention.
Figure 3:
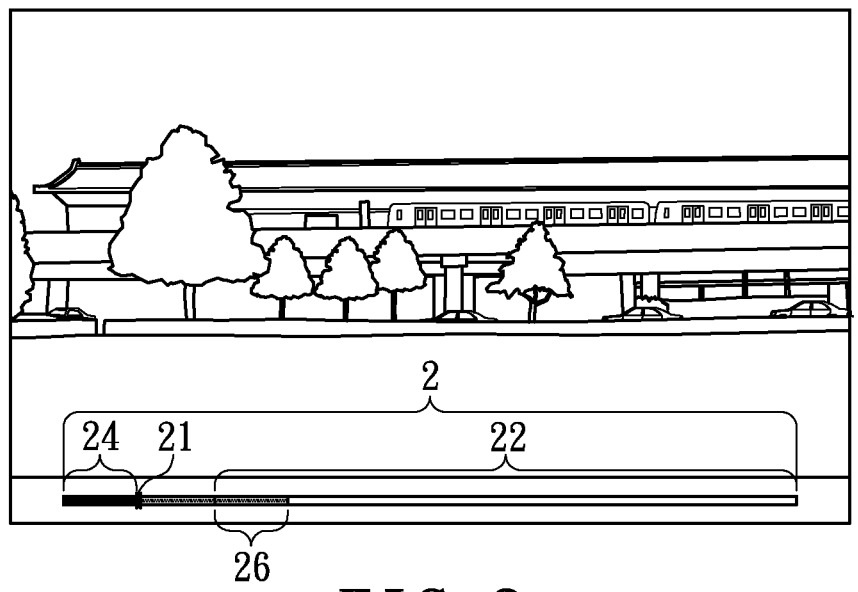
FIG. 3 is the time axis of the video file (which is being displayed) of the embodiment of this invention.

The video player device can accept the instructions of the users, and send a downloading request (S101) to the server via the Internet. The video server will establish a downloading channel with the video player in response to the downloading request, and transmit the content of the video file from the beginning of the video file back to the video player. And the data will be stored by the video player temporarily. When the video player receive the video data from the beginning, based on the data amount of the video file, the transmitting rate and bandwidth of the Internet, it will also calculate the amount of the buffering data which needs to be preloaded and the downloading time to download the buffering data (S103) when downloading the video data according to the playing orders through a single channel. Please refer to the diagram of the video file downloading time axis in the FIG. 2. The length of the time axis of the FIG. 2 represents the total length of the time of the video file 2. The above mentioned buffering data 20 is the data which should be received between the time the video player starts to download the video file 2 until it starts to play the video file 2. Please refer to FIG. 3, for the previous method, the video will be played from the beginning of the video file 2 when the video player has downloaded sufficient buffering data 20 of the video file. The index 21 indicates the playing position of the video file, and the section 24 represents the video data which has already been played. When playing the video, the video player will continue to download the video data 22 other than the buffering data in order to make the video file be played successfully until the end. Take FIG. 3 for an example, after the video player preloading the buffering data 20, the video player has also downloaded another portion of the video data 22 (section 26) when the video has been played from the beginning to the index 21 (section 24).

Figure 4A:
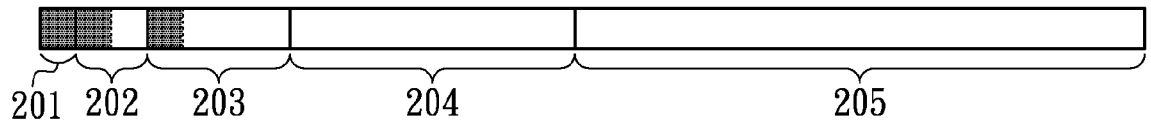
FIG. 4A-4D are the time axis of the buffering data of the embodiment of this invention.

In this embodiment, to shorten the waiting time from beginning to download the data to starting to play the video, the video player will divide the buffering data 20 into multiple time sections (S105), which are 201 to 205 in this embodiment, as shown in FIG. 4A. The beginning part of the video file is the first section (section 201) of the above mentioned time sections. Based on the predetermined number of channels and the order of the time sections, the video player will select one or multiple continuous time sections after the first section, section 201, as the downloading section. The video player will also send a downloading request to the video server according to the starting time of each chosen time section to establish one or multiple downloading channels outside the first section, so that the number of the downloading channels established between the video player and the video server is equal to that of the predetermined ones (S107). The number of the predetermined channels is 3 in this embodiment. Thus, the video player further select the two time sections, 202 and 203, succeeding after the section 201, and send a request to the server to download the data of the section 202 and 203.

After the video player setting up the downloading channel, it can determine if there is sufficient bandwidth for the above mentioned time sections to download simultaneously based on the web traffic and the amount of the data required to be downloaded. If the bandwidth is not sufficient for all the channels to download the data, the later time section will enter the waiting mode temporarily (S111) according to the orders of the time sections, and continue to download when there is sufficient bandwidth.

When the bandwidth is sufficient, the video server can respond with the new one or multiple downloading requests and start to provide the packets according to the starting time which the downloading request indicated. Thus, the video player can not only start to send requests to the video server to download the first time section, 201, but also download the data of one or multiple time sections (time section 202 and 203 in this embodiment) after the first time section of the buffering data. Namely, the video player will establish multiple downloading channels with the video server, and download the different data in different time sections of the buffering data through the above mentioned channels (S113). The time the video player downloads the whole buffering data and users wait for downloading the buffering data can be shorten by simultaneously downloading the data of multiple time sections.

Please refer to FIG. 4A which indicates the time axis of the video player downloading the data. FIG. 4A displays the data downloading condition one second after the video player starts to download the data. The video player can download the data from the beginning of the video file when it sends a downloading request to the video server. The mentioned beginning part is also the beginning part of the buffering data, namely the data of the first second in the video file. Thus, when the video player divides the downloading time of the buffering data into multiple time sections, the data of the first time section (time section 201) is the beginning part of the downloading data. In this embodiment, the length of multiple time sections is exponentially increasing. Take an exponential function which take two as the base number for an example, the length of the time sections 201 to 205 are respectively 1, 2, 4, 8, and 16 seconds. That is to say, the data from the beginning of the first time section (section 201) to the end of the time section 205 comprises the data of the first 31 seconds in the video file.

In this embodiment, other than the data of the first section 201 which has been downloaded in the beginning, according to the number of the channels the video player can send one or multiple requests to the server and simultaneously download the data of multiple time sections. There are three channels in this embodiment, the video player can select the second section (section 202) and third section (section 203) as the downloading section, and send a request to the server to download the data of the second and third time section according to the starting time of the second and third section, which is the first and fourth second. The video player will establish two downloading channels for downloading the data of the second and third time section after the video server responds. The video player can then simultaneously download the buffering data from the first section to the third section from the video server through the multiple channels (There are three channels in this embodiment). In detail, the video player will download the data of the first, second and fourth second in the video file simultaneously; namely, the video player has acquired the data of the first, second, and fourth second in the video file when the video player has downloaded the data for one second as shown in FIG. 4A. Compared to sending only one downloading request to download the data of the first to the third section in order through only one channel, simultaneously downloading the data of multiple sections in this embodiment can save more time.

Please refer to FIG. 1 again, the video player can determine if there is any data downloading of the downloading section has been accomplished (S115). If there is not any downloading has been accomplished, the video player will keep downloading the data from multiple time sections simultaneously (Back to step S113). When any of the downloading via the multiple downloading channels has been accomplished, the video player will determine if the time section after the downloading section will last over the downloading time of the buffering data (S117) in order to determine whether the video player has not sent a downloading request to the server for other time section's data. When the downloading of the first section has been accomplished (after the first second), the video player can estimate the starting time of the fourth section (The eighth second) just after the third section according to the starting time and the length of the third section. The video player can understand if there is some data downloading request in the time section has not been sent to the server by comparing the starting time of the fourth section (204) with the total downloading time of the buffering data 20. If the downloading time for the buffering data 20 in this embodiment is 16 seconds, then the starting time of the fourth section (204) is not over the downloading period.

If there is some data downloading requests in the time section has not been sent to the server, the video player can select the time section after the section which has already been downloaded (the fourth section, 204, in the above example), and send a new downloading request (S119) to the video server according to the starting time of the chosen time section. The video player will maintain the same downloading channels so that the data of the chosen fourth section (204) and the downloading second (202) and third (203) section can be downloaded simultaneously.

After the video player send a new downloading request to the server according to the new chosen downloading section, the server can determine if there is enough bandwidth to download the data of new downloading section according to the step S109. If the bandwidth is not sufficient at that time, the video player will maintain the downloading channel with the server and wait for the bandwidth become sufficient (S111). Please refer to FIG. 4B, when the bandwidth is sufficient for downloading the data of the new downloading section, the video player will download the data of the new downloading section (the fourth section, 204) (S113) from the video server, so that the video player can also receive the data of the other downloading section which has not been accomplished (the second section, 202, and the third section, 203, in the embodiment). Thus, the video player has also downloaded one second's data of the second section (202), the third section (203), and the new fourth section (201) when the $2^{nd}$ second is over according to FIG. 4B. Furthermore, the downloading of the data of the second section (202) whose length is two seconds has also been accomplished at that time.

The video player can estimate the starting time of the fifth section (205) (the $16^{th}$ second) according to the length of the fourth section (204) when the downloading of the two second's data has been accomplished in the second section. The video player will determine if the starting time of the fifth section (205) will be over the downloading period to determine if there is some data downloading request in the time section has not been sent to the server. If the starting time of the fifth section (205) is not over the downloading period, the video player will send a downloading request to the video server according to the starting time of the fifth section in order to let the data of the fifth section and the data of the third and fourth section be downloaded simultaneously. The starting time of the fifth section (205) is the $16^{th}$ second, and the downloading time is twenty seconds in the embodiment; thus, the video player understands that the starting time of the fifth section (205) is not over the downloading period and will send a request to the server to download the data of the fifth section (205). Please refer to the FIG. 4C which shows the diagram at the end of $3^{rd}$ second, another data with the length of one second in the third and fifth section has also been downloaded.

Inversely, if the video player determines that the starting time of the section after the section that has last been requested to download is over the downloading period, the video player will stop sending request to the video server to download the buffering data (S121), because the video player has already sent a request to the video server to download the whole buffering data. The video player only needs to wait the data of the section that has already been requested to be downloaded and then can acquire the whole buffering data. As shown in FIG. 4D, the data with the length of four seconds in the third section has all been downloaded, and another data with the length of one second in the fourth and fifth section has also been downloaded respectively at the time that the downloading has lasted four seconds. Through the above methods, the video player can download the required buffering data continuously and quickly so that the video file can be played smoothly.

Figure 5A:
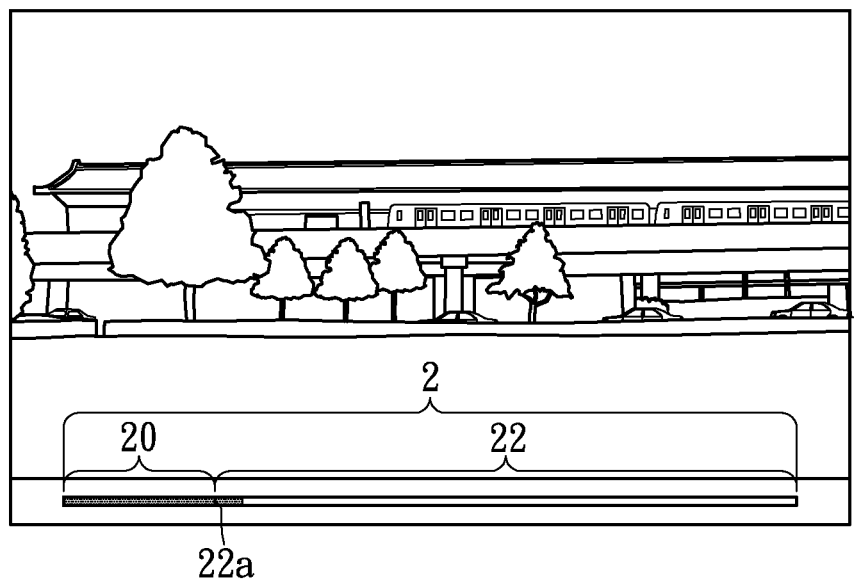
FIG. 5A is the time axis of the video file of the embodiment of this invention (the video data has not been divided)

When the buffering data has all been downloaded from the server (Step S123), the video player will send another request to the video server to download the video data other than the buffering data in the video file (S125). The video player can download the mentioned video data through a single downloading channel (As shown in FIG. 5A, section 22), because the video player has already acquired the buffering data which can let the video be played smoothly until the end. The above methods can let the video server download the buffering data quickly, and also relieve the burden of the video player's processing unit and the needs for the bandwidth when it has acquired the buffering data.

That is to say, the video player can play the data from the first section (201), when the data of the first section (201) has been downloaded. The video player will download the data of multiple sections simultaneously in this embodiment; thus, the increasing rate of the data due to the downloading is three times as the decreasing rate of the data due to the playing if the rate of the downloading is equal to that of the playing. The video player can play the video file as soon as the data of the first section has been downloaded instead of waiting the whole buffering data to be downloaded through the methods shown in this embodiment.

Figure 4B:
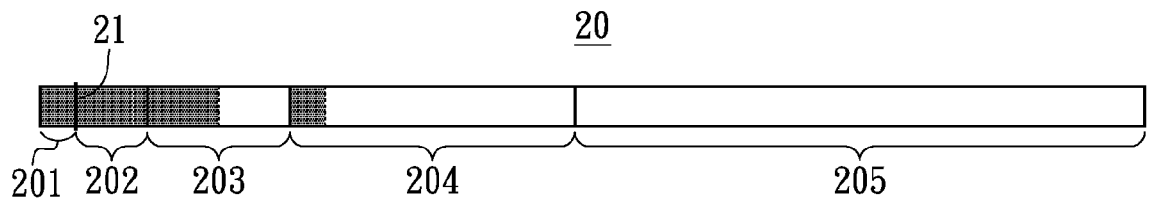
Figure 4C:
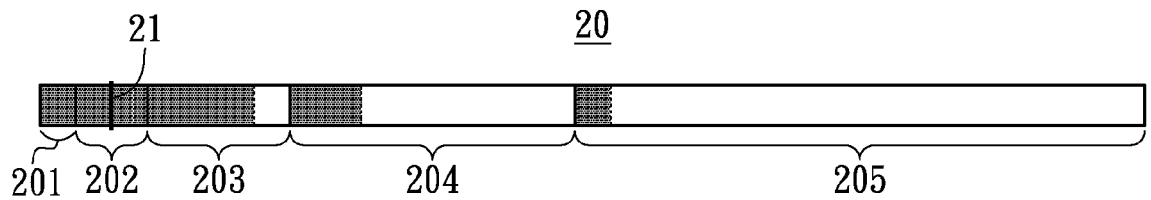
Figure 4D:
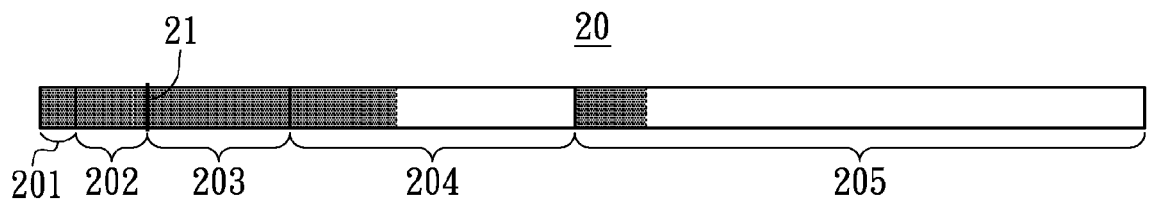

Furthermore, please refer to FIG. 4A to FIG. 4D again. The data of the first section (201) has been downloaded when the first second is over because the length of the data of the first section is one second as shown in FIG. 4A. The video player can start to play the data of the video file in the $2^{nd}$ second. Besides the accomplishment of the downloading of second and third second of the second section (202), the downloading data of the first section (201) has also been played when the $2^{nd}$ second is over, which is the time the index 21 indicated, as shown in FIG. 4B. Thus, the video player can play the $2^{nd}$ to $3^{rd}$ second of the video file at the time between $3^{rd}$ and $4^{th}$ second (According to FIG. 4C and FIG. 4D). As shown in FIG. 4D, when the $4^{th}$ second is over, besides the fact that the data of the $2^{nd}$ and $3^{rd}$ second has been played, the data with a length of four seconds in the third section (203) has also been downloaded. Thus, the mentioned methods in the embodiment can provide the effect that the downloading of data in the next section has been accomplished when the downloading data in each section has been played. Thus, when the video player starts to play the video file, the video file can definitely be played smoothly until the end.

Furthermore, when the downloading of the data with a length of one second in the first section has been accomplished, the data in the second section has been downloaded half (one second) as shown in FIG. 4A to FIG. 4D. And when the downloading of the data with a length of two seconds in the second section has been accomplished, the data in the third section has been downloaded half (two seconds). Thus, the mentioned methods in the embodiment can provide the effects that when the data of every section has been downloaded, the data of the next section has also been downloaded half. The data thus can be downloaded smoothly.

Plus, the length of every section in the embodiment can also be set equally according to the pre-determined preloading time rather than the increasing exponential form. For instance, the length of each time section is three seconds.

But the above method is just an example, the present invention is not limited thereto.

Figure 5B:
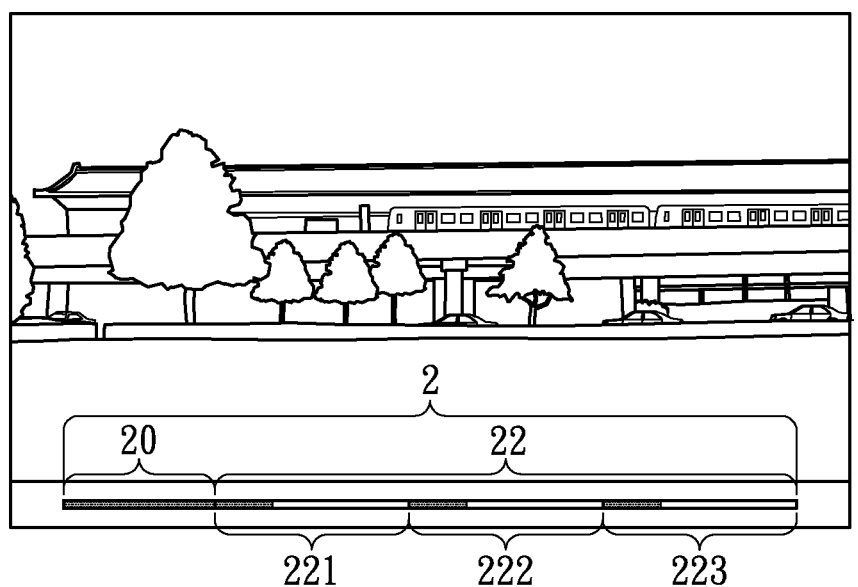
FIG. 5B is the time axis of the video file of the embodiment of this invention (the video data has been divided into multiple sections)

Please refer to FIG. 5B, when downloading the remaining video data in the video file (step S123), the video player can keep the original multiple downloading channels (three channels in the above example) and divide the required time to download the video data other than the buffering data into multiple sections according to the number of the downloading channels as the section 221, 222, and 223 shown in FIG. 5B. The video player will send a downloading request to the server to download the data other than the buffering data according to the starting time of the section 221, 222, and 223. Through the above method, the video player can download the buffering data by downloading the data of multiple sections and also shorten the time to download the whole video file by downloading the remaining data in each section separately.

[Another Embodiment of the Streaming Data Downloading Methods]

Figure 6:
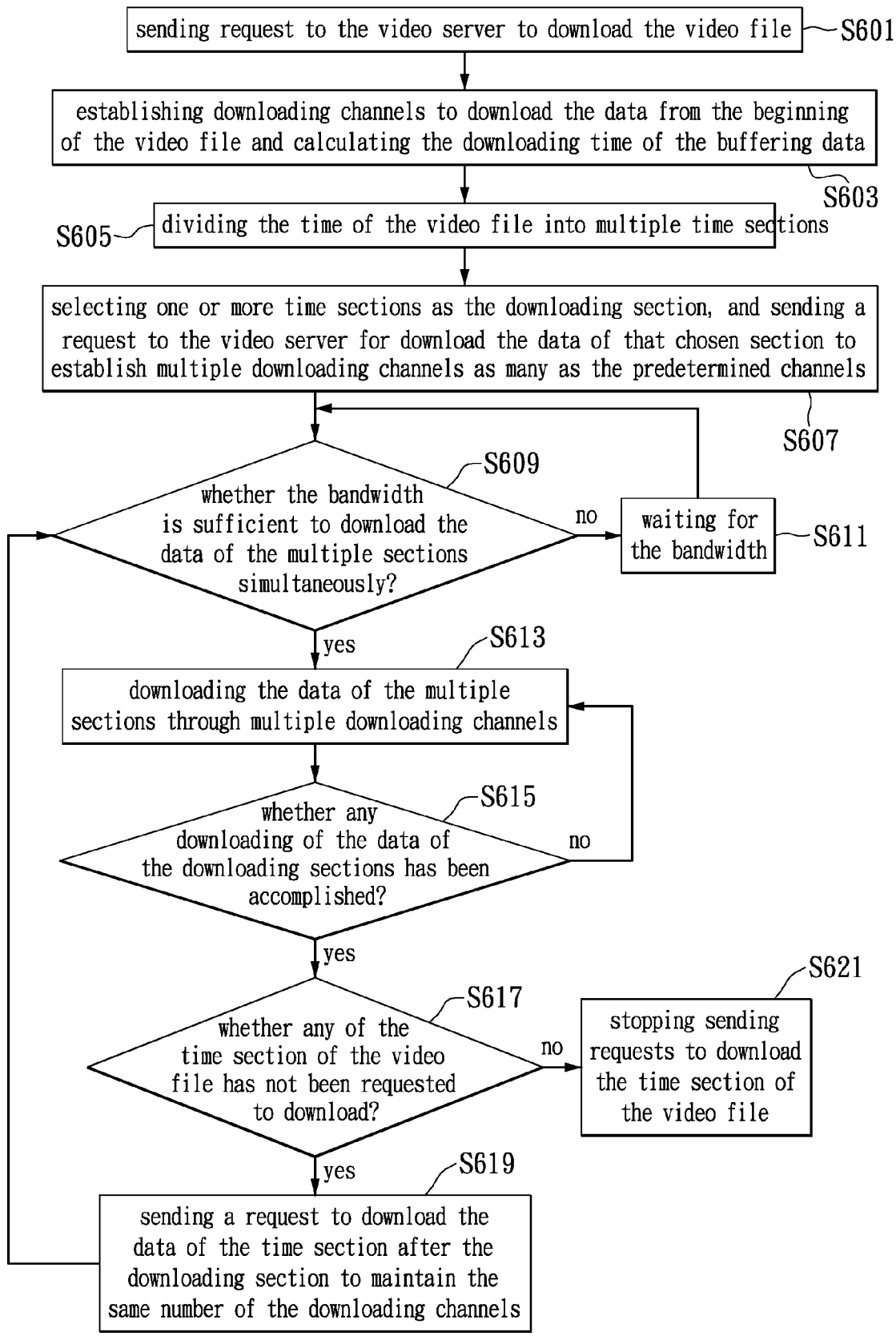
FIG. 6 is the flow diagram of another streaming data downloading method of the embodiment of this invention.

Please refer to FIG. 6, the flow diagram of another embodiment of the streaming data downloading method is shown in FIG. 6. The method in this embodiment can also be used for the video player to download the video file from the video server via the Internet.

The video player can generate instructions by receiving user's choice for the video file, and send a downloading request (S601) to the video server to download the chosen video file through the Internet. The video server can establish a downloading channel with the video player by responding to the received downloading request. The video player can transmit the content of the video file to the video player through the Internet from the beginning of the video file for the video player to temporarily store. The video player will also calculate the data amount of the buffering data which requires preloading, the time of downloading the buffering data and the time of downloading the whole video file (S603) according to the data amount of the whole video file and the transmission rate and bandwidth of the Internet when the video player starts to download the video file.

Figure 7:
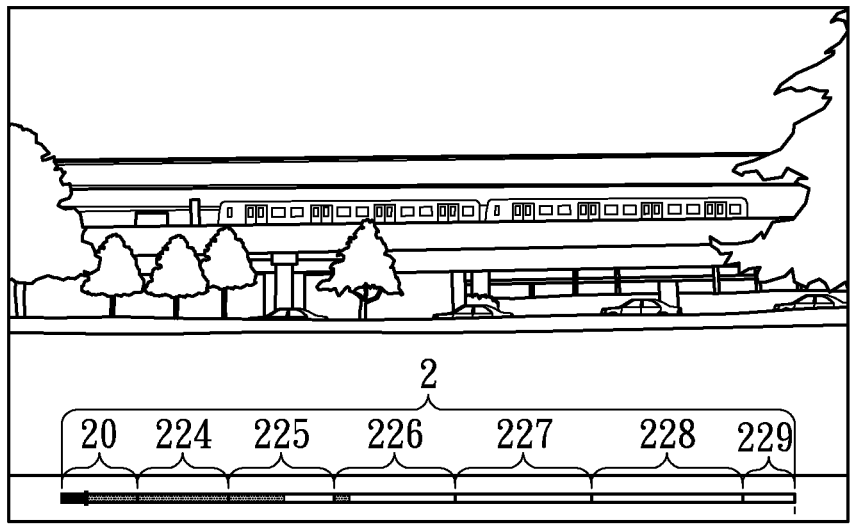
FIG. 7 is the time axis of the video file of the embodiment of this invention (the video data has been divided into multiple sections)

Please refer to FIG. 7, the difference with the previous embodiment is that the video player will divide the time of downloading the whole video file into multiple sections (S605) according to the downloading time in this embodiment. The video file is divided into seven sections, 20', 224 to 229 in the embodiment in the FIG. 7. The downloaded buffering data of the beginning of the video file is the first section 20', of the mentioned time sections.

The video player will select one or multiple sections after the section 20' as the downloading section according to the order of the time sections. The video player will send a downloading request to the server separately and establish one or multiple downloading channels (S607) besides the first section according to the starting time of the chosen time section.

After setting up the downloading channel, the video player will determine if there is sufficient bandwidth to download the data of multiple sections simultaneously (S609). If the bandwidth is not sufficient for the video player to download the data of all the channels simultaneously, the time sections in the later part will enter the waiting mode temporarily (S611), until the bandwidth becoming sufficient.

When the bandwidth is sufficient, the video server will respond to the new downloading request, and provide data according to the starting time of each time section indicated by the downloading request. The video server can thus not only download the buffering data of the first section 20', but also download the data of one or more time sections after the buffering data simultaneously (S613). The second section, 225, and the third section, 226, in the FIG. 7 are the downloading sections, and the video player will download the data of these sections as it download the buffering data of the first section 20'.

The video player can keep determining if the downloading of any section has been accomplished (S615). The video player will keep downloading the data of the mentioned multiple sections, if not any downloading has been accomplished (back to step S613). If any of the downloading through the multiple downloading channels has been accomplished, the video player will determine if there is any data of the other time sections has not been requested to download (S617). The video player will select another time section which has not been requested to download as the new downloading section, if there is any section in the video file has not been requested to download. The video player will send a downloading request to the server according to the starting time of the new downloading time section (S619).

As shown in FIG. 7, when the downloading of the section 20' has been accomplished, the video player can estimate the starting time of the fourth section 226 after the third section 225 through the starting time and the length of the third section 225, which is the last downloading section in the of the sections which have been requested to download. The video player can determine if the starting time of the fourth section 226, is over the video file to know if there is still time sections which have not been requested to download.

If the time section after the downloading section is not over the whole video file, which represents there is still time section which has not been requested to download (section 226 to section 229 in FIG. 7), the video player will select one of the time sections after each downloading section as the new downloading section (section 226 in the embodiment). Through the above methods, when the downloading of the buffering data in the first section, 20, has been accomplished and if the bandwidth is sufficient, the video player can the download the data of the second section, the third section, and the fourth section (section 224,225, 226) simultaneously. (As shown in FIG. 7)

Relatively, if one downloading of the downloading time sections has been accomplished, the video player will stop sending downloading request to the server if it determine every time section in the video file has been requested to download. The video player then only needs to wait the downloading of one or multiple sections to be accomplished in order to get the whole data of the video file (S621).

When the downloading of the buffering data of the first section, 20, the video player will play the video file from the first section, 20, in order.

The length of each mentioned time section can be divided equally according to the downloading time of the buffering data. For instance, the length of each time section is equal to the downloading time. The length of each time section can be divided according to the exponential form. For instance, the downloading time of the buffering data is one second, taking three as the base number, the length of the first section is one second, the length of the second section is three seconds, and the length of the third section is nine seconds. But the above method is just an example, the present invention is not limited thereto.

Please refer to the previous embodiment for the common features with this embodiment, they will not be restated in this embodiment.

[The Embodiment of the Video Player Device]

Figure 8:
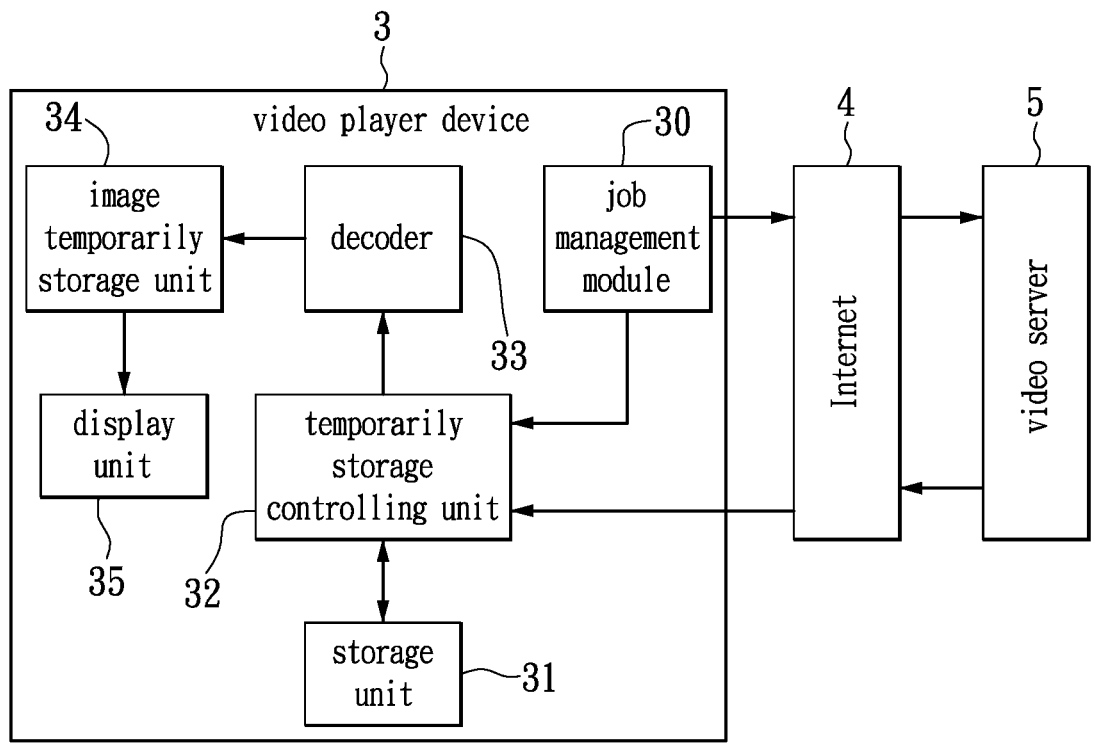
FIG. 8 is the block diagram of the video downloading device of the embodiment of this invention.

Please refer to FIG. 8, a block diagram of the video player is shown in FIG. 8.

The video player 3 in this embodiment comprises job management module 30, storage unit 31, temporarily storage controlling unit 32, decoder 33, image temporarily storage unit 34, and display unit 35. The mentioned display device 3 can be connected to the server 5 via the Internet 4, and carry out the streaming data downloading methods in FIGS. 1 and 6 to get and play the video file chosen by the user. The job management module 30 is used to control the time and number of the downloading requests to the video server 5. The job management module 30 can send a downloading request to the video server 5, calculate the buffering data and it's downloading time by the response of the server 5, and send multiple downloading requests to the video server 5 by the number of the predetermined channels and the starting time of each section. The video player 3 can then download the data of multiple time sections simultaneously.

The data of video file downloaded from the video server 5 via the Internet 4 is stored temporarily in the storage unit 31, and is arranged by the temporarily storage controlling unit 32 according to the time of the data and the time section it belongs to.

When the downloading of the data of the first section has been accomplished, the temporarily storage controlling unit 32 will send the data of the first section to the decoder 33 to be decoded and rearranged. The data then will be stored in the image temporarily storage unit 34 in order to be output to the display unit 35. Users can then watch the image of the video file from the display unit 35.

[The Possible Effects of the Embodiment]

According to the embodiment of the present invention, with the above mentioned streaming data downloading methods and downloading the buffering data of multiple sections simultaneously, the video player can download the buffering data from the server to the display device quickly, and thus the waiting time for the uses can be greatly reduced.

Furthermore, according to the embodiment of the present invention, with the above mentioned streaming data downloading methods and downloading the whole video data of multiple sections simultaneously, the data in the later part of the video file can be stored in the video player in advance. By this, the content of the whole video file can be downloaded to the video player quickly, and the video player can also play the video smoothly.

Plus, according to the embodiment of the present invention, with the mentioned streaming data downloading methods and the video player device, the video player can download the buffering data of multiple sections simultaneously. The video player will download the remaining video data of each section simultaneously, when the video player has acquired the whole buffering data. With the above methods, when the users want to fast forward to watch the later part of the video file, the waiting time for downloading the data can also be shorten due to the preloading of the portion of the data in the later part. Thus, through the methods in the present invention, the waiting time for the users to wait for the playing of the video can be effectively shorten. The video player will download the video data of each section other than the buffering data when playing the video file. Thus, the video player can respond to the users' demand of fast forwarding the video file.

With the above mentioned methods, in order to attain the above mentioned effects, the video player only needs to calculate and allocate the time sections and send multiple downloading requests to the video server. The operation or providing data methods of the video server have not been changed, thus, the users can still select different video files on different video servers to watch arbitrarily. By this, the customs of the users will not be altered and the waiting time of the users can also be shortened. This method can provide a great user experience.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims

What is claimed is:

1. A streaming data downloading method, adapted for a video player to download a video file from a video server via the Internet, comprising:

sending a request to the video server for downloading the video file, so as to download buffering data from beginning of a buffering section of the video file;

calculating a downloading time for completely downloading the buffering data;

dividing the downloading time into multiple time sections for downloading the buffering data corresponding to the multiple sections from the video server separately, wherein the multiple time sections are calculated based on an exponential function such that the time lengths of the multiple time sections are exponentially increasing;

selecting at least one of the multiple time sections as a downloading section, and requesting to the video server for downloading data of the downloading section, in order to establish multiple downloading channels corresponding to a channel quantity; and downloading the data of multiple downloading sections simultaneously according to the multiple downloading channels.

2. The streaming data downloading method of claim 1, further comprising:

determining whether the data of any of the multiple downloading sections has been completely downloaded;

when the data of one of the multiple downloading sections has been completely downloaded, determining whether any time section after the multiple downloading sections has not been requested to be downloaded; and when there is time section which has not been requested to be downloaded, selecting one of the time sections which have not been requested to download as a new downloading section, and sending a request to the video server to download the data of the new downloading section to maintain the number of the channels.

3. The streaming data downloading method of claim 2 further comprising:

sending a new downloading request to the video server to download the data of the new downloading section until all of the data of the multiple time sections have been downloaded.

4. The streaming data downloading method of claim 3, wherein in the step of dividing the downloading time into multiple time sections, the data downloaded from the beginning of the buffering data is the data of a first section of multiple time sections.

5. The streaming data downloading method of claim 4, wherein the multiple downloading sections selected from the multiple time sections include the first section, and the multiple downloading requests sent to the video server include the request for downloading the video file.

6. The streaming data downloading method of claim 4, wherein the step of when one of the multiple downloading sections has been completely downloaded, determining whether there is any time section has not been requested to be downloaded after the multiple downloading sections further comprising:
 determining whether the downloaded data is the data of the first time section; and
 when the data of the first section has been completely downloaded, playing the video file from the data of the first time section.

7. The streaming data downloading method of claim 1, wherein when one of the data of the multiple time sections has been played to the end, the data of the next time section has also been completely downloaded.

8. The streaming data downloading method of claim 1, wherein when one of the data of the multiple time sections has been completely downloaded, half of the data of the next time section has been downloaded.

9. The streaming data downloading method of claim 3, wherein the step of downloading the data from multiple downloading sections simultaneously according to the multiple downloading channels further including:
 determining whether the bandwidth is sufficient to download the data of the multiple downloading sections;
 when the bandwidth is not sufficient, keep at least one of the downloading sections await until the bandwidth increases or one of the multiple sections has been downloaded completely; and
 when the bandwidth is sufficient, starting to download the data of the new downloading sections.

10. The streaming data downloading method of claim 3, wherein when all of the data of the multiple sections have been completely downloaded, further comprises:
 requesting to the video server for downloading the video data other than the buffering data of the video file.

11. The streaming data downloading method of claim 10, wherein when all of the data of the multiple sections have been completely downloaded, further comprises:
 dividing the data of the video file other than the buffering data into multiple sections; and
 requesting to the video server for downloading the data of multiple sections simultaneously according to the number of the sections.

12. The streaming data downloading method of claim 3, wherein the step of dividing the downloading time into multiple time sections further comprises:
 dividing the downloading time according to a preloading time, wherein each of the multiple time sections includes one or more of the preloading time;
 wherein, the preloading time is the waiting time from starting to download the buffering data to starting to play the video file.

13. A non-transitory computer readable recording medium recording a set of codes, wherein when the set of the codes is read by a processor, the processor performs the set of the codes to implement the streaming data downloading method as claimed in claim 1.

14. A streaming data downloading method, adapted for a video player to download a video file from the video server via the Internet, comprising:
 requesting the video server for downloading the video file;
 downloading the data from the beginning of a buffering data of the video file and calculating a file time for downloading the video file and a downloading time for downloading the buffering data;
 dividing the file time into multiple time sections according to the downloading time, in order to download data of the multiple time sections separately from the video server wherein the multiple time sections are calculated based on an exponential function such that the time lengths of the multiple time sections are exponentially increasing;
 selecting at least one of the multiple time sections as the downloading section, and requesting to the video server for downloading data of the selected time sections to establish multiple downloading channels corresponding to a channel quantity;
 downloading data of the multiple downloading channels simultaneously according to the multiple downloading channels;
 when the data of one of the multiple downloading channels has been completely downloaded, determining whether any of the time section after the multiple downloading sections has not been requested to be downloaded;
 when there is time section that has not been requested to be downloaded, selecting one of the time sections which have not been requested to be downloaded as a new downloading section; and
 sending a new downloading request to the video server for downloading the data of the new downloading section until all of the data of the multiple time sections have been completely downloaded.

15. The streaming data downloading method of claim 14, wherein in the step of dividing the file time into multiple time sections according to the downloading time, the buffering data is the data of a first section of the multiple time sections.

16. The streaming data downloading method of claim 15, wherein the multiple downloading sections selected from the multiple time sections include the first section, and the multiple downloading requests to the video server include the request for downloading the video file.

17. The streaming data downloading method of claim 15, wherein when data of one of the multiple downloading sections have been completely downloaded, determining whether any of the time section after the multiple time sections has not been requested to be downloaded, further comprises:
 determining whether the downloading section which has been downloaded is the first section; and
 when the buffering data of the first section have been completely downloaded, playing the video file from the buffering data.

18. The streaming data downloading method of claim 14, wherein the step of downloading the data of multiple downloading sections simultaneously according to the multiple downloading channels further comprises:
 determining whether the bandwidth is sufficient for downloading the data of the downloading sections;
 when the bandwidth is not sufficient, keep at least one of the downloading sections await until the bandwidth increases or the data of one of the multiple downloading sections have been completely downloaded; and
 when the bandwidth is sufficient, downloading the data of the downloading sections immediately.

19. A non-transitory computer readable recording medium recording a set of codes, wherein when the set of the codes is read by a processor, the processor performs the set of the codes to implement the streaming data downloading method as claimed in claim 14.

* * * * *